(12) United States Patent
Song et al.

(10) Patent No.: US 10,698,476 B2
(45) Date of Patent: Jun. 30, 2020

(54) MINITYPE HAPTIC RENDERING METHOD BASED ON ACTIVE AND PASSIVE DEVICES

(71) Applicant: SOUTHEAST UNIVERSITY, Jiangsu (CN)

(72) Inventors: Aiguo Song, Jiangsu (CN); Huanhuan Qin, Jiangsu (CN); Huijun Li, Jiangsu (CN); Baoguo Xu, Jiangsu (CN); Hong Zeng, Jiangsu (CN)

(73) Assignee: SOUTHEAST UNIVERSITY, Jiangsu (CN)

(*) Notice: Subject to any disclaimer, the term of this patent is extended or adjusted under 35 U.S.C. 154(b) by 0 days.

(21) Appl. No.: 16/467,984

(22) PCT Filed: May 23, 2018

(86) PCT No.: PCT/CN2018/088053
§ 371 (c)(1),
(2) Date: Jun. 10, 2019

(87) PCT Pub. No.: WO2018/219193
PCT Pub. Date: Dec. 6, 2018

(65) Prior Publication Data
US 2020/0073472 A1    Mar. 5, 2020

(30) Foreign Application Priority Data
May 27, 2017  (CN) .......................... 2017 1 0396225

(51) Int. Cl.
*G06F 3/01*        (2006.01)
*G08B 6/00*        (2006.01)
(52) U.S. Cl.
CPC ................ *G06F 3/011* (2013.01); *G08B 6/00* (2013.01)
(58) Field of Classification Search
CPC ............ G06F 3/011; G06F 3/016; G08B 6/00
See application file for complete search history.

(56) References Cited

U.S. PATENT DOCUMENTS

2018/0301140 A1*  10/2018  Turcott .................. G10L 25/48

FOREIGN PATENT DOCUMENTS

| CN | 103473978 | 12/2013 |
|----|-----------|---------|
| CN | 104840334 | 8/2015  |
| CN | 107229334 | 10/2017 |

OTHER PUBLICATIONS

"International Search Report (Form PCT/ISA/210) of PCT/CN2018/088053," dated Sep. 5, 2018, with English translation thereof, pp. 1-4.

* cited by examiner

*Primary Examiner* — Michael Pervan
(74) *Attorney, Agent, or Firm* — JCIPRNET

(57) ABSTRACT

The present invention discloses a minitype haptic rendering method based on active and passive devices, which comprises the following steps of: firstly, calibrating a magnetorheological damper and a direct current motor, and obtaining a relationship between an input current and an output torque; converting an expected force/torque value to a current input of the magnetorheological damper, outputting a corresponding torque through the magnetorheological damper, and applying the torque to a body of an operator through a haptic transmission device; secondly, measuring an actually applied force/torque by a sensor mounted at a force/torque application point, comparing an actually outputted force/torque value with the expected force/torque value, and calculating a force/torque error; and finally, converting the force/torque error to an input signal of the direct current motor, and driving the direct current motor to generate a torque corresponding to the error.

2 Claims, 5 Drawing Sheets

MINITYPE HAPTIC RENDERING METHOD BASED ON ACTIVE AND PASSIVE DEVICES

CROSS-REFERENCE TO RELATED APPLICATION

This application is a 371 of international application of PCT application serial no. PCT/CN2018/088053, filed on May 23, 2018, which claims priority to and the benefit of China Patent Application No. CN201710396225.7, filed on May 27, 2017. The entirety of each of the above-mentioned patent applications is hereby incorporated by reference herein and made a part of this specification.

TECHNICAL FIELD

The present invention relates to a haptic rendering method, and more particularly, to a high-precision minitype haptic rendering method based on active and passive devices.

BACKGROUND

Haptic rendering refers to a process in which a user touches, feels and manipulates a virtual or remote object by a haptic rendering device to obtain characteristics of a virtual or remote object and sense information of the virtual or remote object. An operator can interact with a virtual or remote environment in a natural way by the haptic rendering device, thus having an immersion feeling consistent with a real environment, and haptics has a broad application prospect in the fields of virtual reality, teleoperation robot, medical service and the like.

An executing device is an important component of the haptic rendering device and an important link of transmitting a haptic stimulation, and the characteristics of the executing device directly affect the performance of the haptic rendering device and the fidelity and immersion feeling of haptic interaction. At present, the more widely used devices in the haptic rendering device include a direct current motor, a magnetorheological damper, a pneumatic actuator, etc. These executing devices have their own advantages and disadvantages: for example, the direct current motor is simple in control and can be precisely controlled, but a torque/volume ratio is small; and the magnetorheological damper has a high energy density, a small volume and a high force output, but it cannot be precisely controlled.

SUMMARY

Object of the invention: based on the problems existing in the prior art, the present invention is intended to provide a minitype haptic rendering method which uses a direct current motor as an active device and a magnetorheological damper as a passive device, and combines the active device and the passive device to output high-precision and large-range force/torque by a minitype device.

Technical solution: according to the present invention, a minitype haptic rendering method based on active and passive devices comprises the following steps.

Step (A): construct a minitype haptic rendering device, the device comprising an executing device, a force/torque sensor and a haptic transmission device, and the executing device comprising a magnetorheological damper and a direct current motor; calibrate the magnetorheological damper and the direct current motor, and obtain a relationship between an input current and an output torque; use a least square method, a neural network algorithm or a support vector machine algorithm for calibrating the magnetorheological damper; and set a calibration curve function of the damper as:

$$y1 = f_b(x)$$

wherein, y1 is an output torque of the damper, x is the input current, and $f_b$ is a mapping relationship between the input current and an output torque of the magnetorheological damper.

The input of the direct current motor has a linear relationship with an output of the direct current motor, and sets a calibration curve function of the direct current motor as:

$$y2 = k_m x$$

wherein, y2 is an output torque of the motor, x is the input current, and $k_m$ is a mapping relationship between the input current and an output torque of the motor.

Step (B): convert an expected force/torque value to a current input signal of the magnetorheological damper, output a corresponding torque through the magnetorheological damper, apply the torque to a body (such as a finger and a hand) of an operator through a haptic transmission device, set the expected force/torque as F, and a mapping relationship between an output of the haptic transmission device and an output of the executing device as $T_h$, then a theoretical value of the output of the magnetorheological damper being $T_h^{-1}(F)$, and the converted current input signal of the magnetorheological damper is $f_b^{-1}[T_h^{-1}(F)]$, set an actual output of the magnetorheological damper corresponding to the input current i as $T_b(i)$, then the actual output of the magnetorheological damper is $T_b\{f_b^{-1}[T_h^{-1}(F)]\}$, then the force/torque applied on the body of the operator is $T_h\{T_b\{f_b^{-1}[T_h^{-1}(F)]\}\}$.

Step (C): measure the actually applied force/torque value by a force/torque sensor mounted at a force/torque application point, compare an actual output with an expected output, and calculate a force/torque error, wherein the error fed back by the force/torque sensor can be represented as:

$$\Delta = F - T_h\{T_b\{f_b^{-1}[T_h^{-1}(F)]\}\}.$$

Step (D): convert the force/torque error to an input signal of the direct current motor, drive the direct current motor to generate a torque corresponding to the error, and set a force/torque actually compensated by the direct current motor as $\Delta_m$.

Step (E): superpose the output of the direct current motor and the output of the original magnetorheological damper to eliminate the force/torque error and realize precise control over the force/torque, wherein the force/torque finally applied on the body of the operator can be represented as:

$$T_h(\Delta_m) + T_h\{T_b\{f_b^{-1}[T_h^{-1}(F)]\}\}.$$

Working principle: the direct current motor is used as the active device of the present invention, the force/torque of the direct current motor is conveniently controlled, the force/torque can be precisely controlled, and an output shaft of the direct current motor is connected with an output shaft of the magnetorheological damper to compensate the force/torque error; the magnetorheological damper is used as the passive device, the magnetorheological damper has the advantages of small volume and high force output, and a torque/volume ratio of the magnetorheological damper is more than 50 times that of the direct current motor; the two are combined in the present invention, firstly the magnetorheological damper is used to "roughly adjust" the force/torque to realize large-range force/torque output, and then the force/ torque sensor is used to form a feedback loop to calculate an error between the output and the expected output of the magnetorheological damper and convert an error signal to the input signal of the direct current motor; and finally, the direct current motor is used to compensate the force/torque error, which is to compensate the force/torque error of 5% to 10% F.S generated by the magnetorheological damper, so as to realize precise control over the large-range force/torque.

Beneficial effects: compared with the prior art, the present invention has the following significant advantages: 1. compared with the conventional haptic rendering method based on single active device or passive device, the rendering method combines the advantages of the magnetorheological damper and the direct current motor, implementing precise control and large torque/volume ratio; 2. the minitype device can output the large-range and high-precision force/torque, so that the haptic rendering device is more portable and exquisite, and a fidelity and an immersion feeling of haptic interaction are improved; and 3. since the force feedback with high precision and strong capability enables the operator to more truly feel a rigid object in a virtual environment and feel remote environment information of a manipulator, the present invention can be widely applied to the fields of virtual reality, teleoperation robot control, medical service and the like, and particularly applied to simulate more abundant human tissues and organs such as blood vessels, muscles, bones, teeth and the like in a virtual surgery.

DETAILED DESCRIPTION

The technical solution of the present invention is further described in details hereinafter with reference to the embodiment and the drawings.

Embodiment

Figure 1:
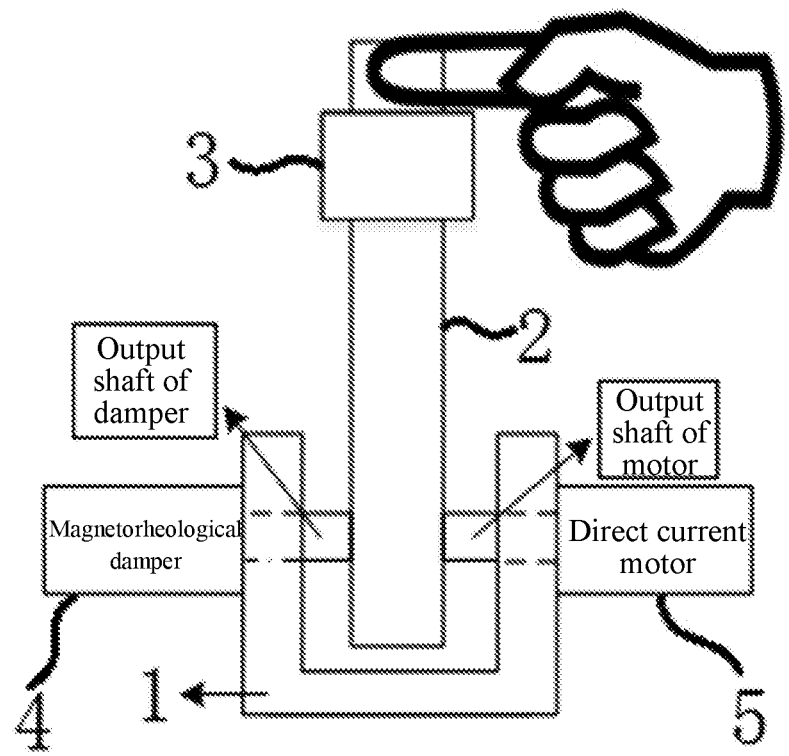
FIG. 1 is a structure diagram of a haptic rendering device according to the present invention.

As shown in FIG. 1, a haptic rendering device comprises a bracket 1, executing devices fixed at two sides of the bracket 1, a haptic transmission device 2 connected with an output shaft of the executing device, and a force/torque sensor 3 arranged at a tail end of the haptic transmission device 2. The force/torque sensor is used for measuring an actually applied force/torque to form a feedback loop; the executing device is composed of a magnetorheological damper 4 and a direct current motor 5, and an output shaft of the direct current motor is connected with an output shaft of the magnetorheological damper.

A minitype haptic rendering method based on active and passive devices comprises the following steps.

Figure 2:
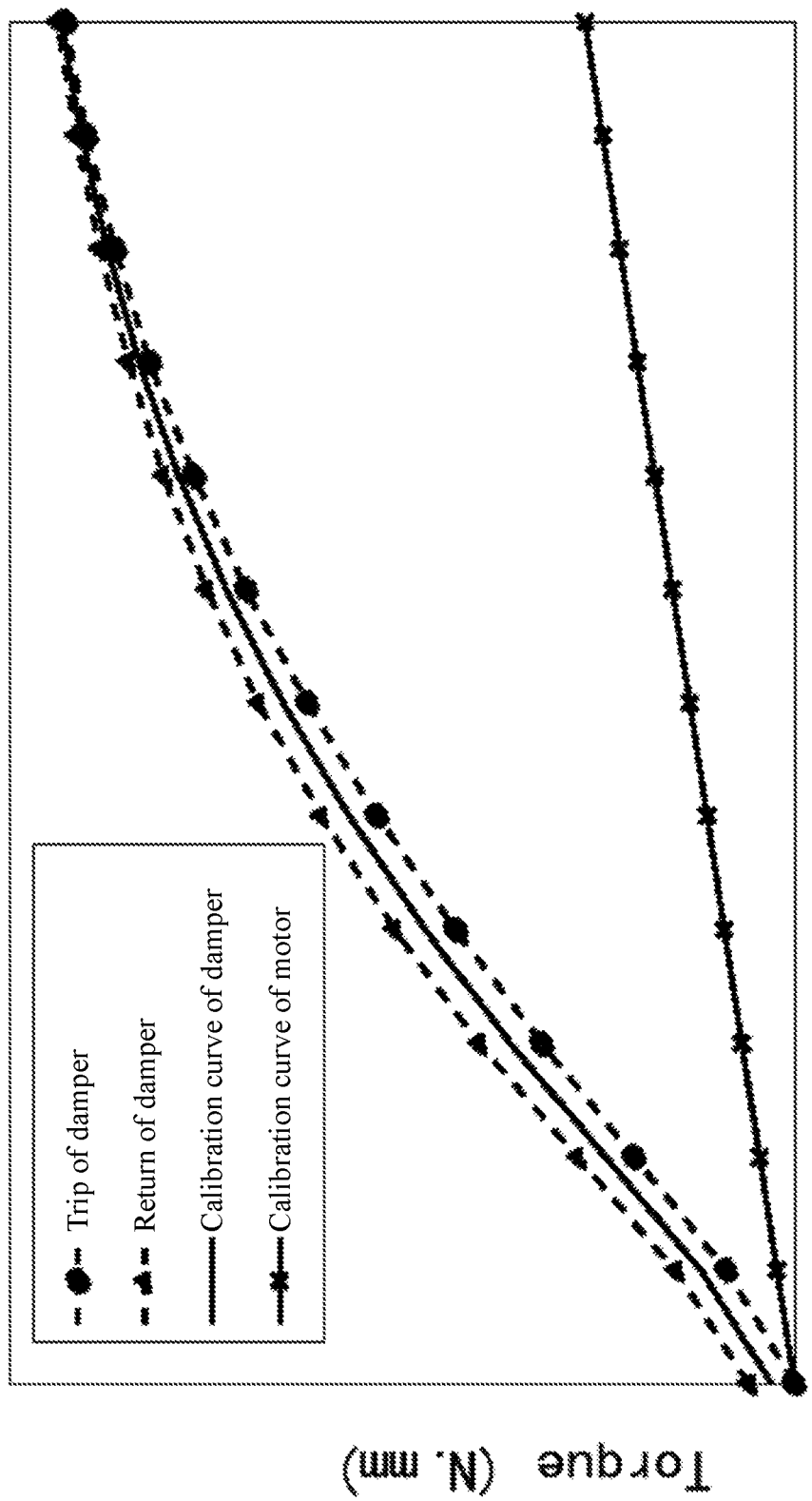
FIG. 2 is calibration curves of a magnetorheological damper and a direct current motor.

Step (A): construct the device above, and calibrate the magnetorheological damper and the direct current motor to obtain a relationship between an input current and an output torque, wherein the magnetorheological damper is made of ferromagnetic materials, one of inherent characteristics of the ferromagnetic materials is magnetic hysteresis, that is, a change of a magnetic induction intensity lags behind a change of a magnetic field intensity, and the reaction in the torque is that the torque lags behind a change of a current. As shown in FIG. 2, a return torque of the damper obviously lags behind the current, the magnetorheological damper has a saturation point, the torque and the current almost have a linear relationship before reaching the saturation point, the torque is limited and increased slowly with the increase of the current after reaching the saturation point, showing an obvious nonlinear relationship. The dotted lines in the drawing show relationships between the torque and the current of the damper in trip and return, solid lines show calibration curves using a least square method, and a calibration curve function of the damper is set as:

$$y1=f_b(x).$$

An output and an input of the direct current motor show a linear relationship, and a calibration curve function of the direct current motor is set as:

$$y2=k_m x,$$

wherein y1 and y2 are respectively output torques (unit: N·mm); x is the input current (unit: A); $f_b$ is a mapping relationship between the input current and an output torque of the magnetorheological damper; and $k_m$ is a mapping relationship between the input current and an output torque of the motor.

Figure 3:
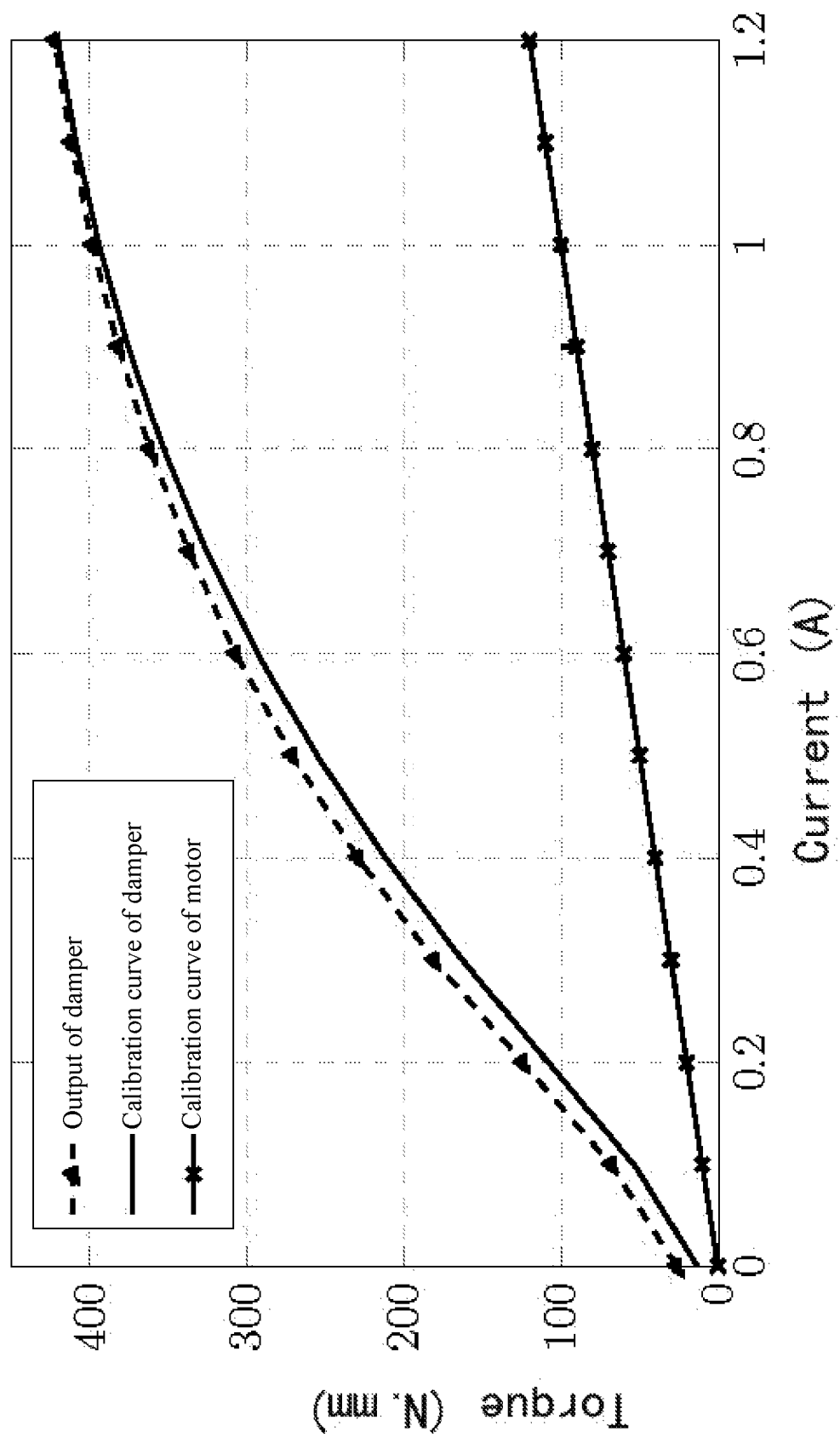
FIG. 3 is a diagram illustrating an actual torque-current relationship of the magnetorheological damper and the direct current motor.

FIG. 3 is a diagram illustrating an actual torque-current relationship of the magnetorheological damper and the direct current motor according to the embodiment, and in the drawing, the least square method is used for calibrating the damper, and a curve function is set as:

$$y1=-218.41x^2+611.15x+2.0852.$$

The output and the input of the direct current motor show a linear relationship, and a calibration curve function of the direct current motor is set as:

$$y2=100x.$$

Figure 4:
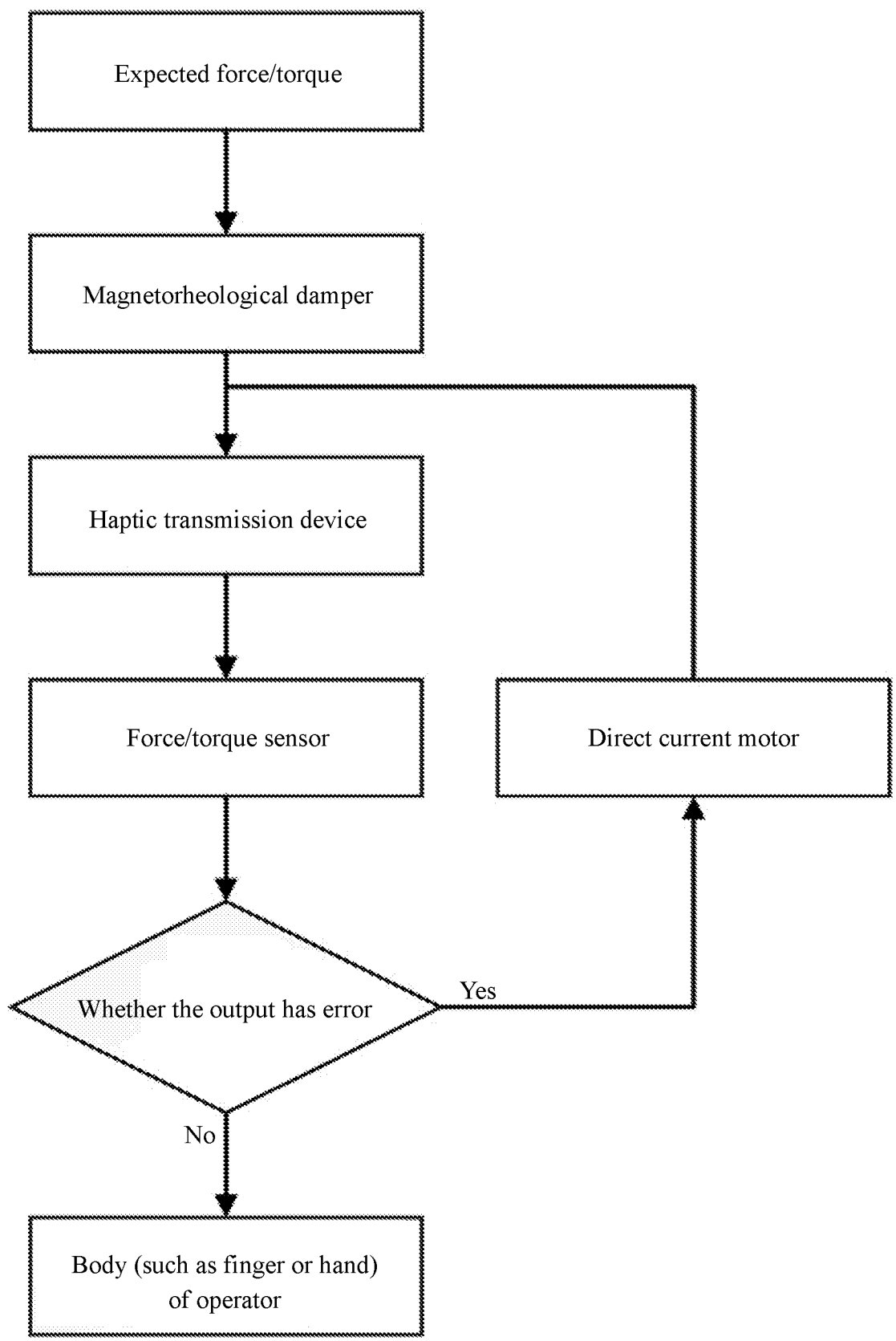
FIG. 4 is a flow chart of a haptic rendering method.
Figure 5:
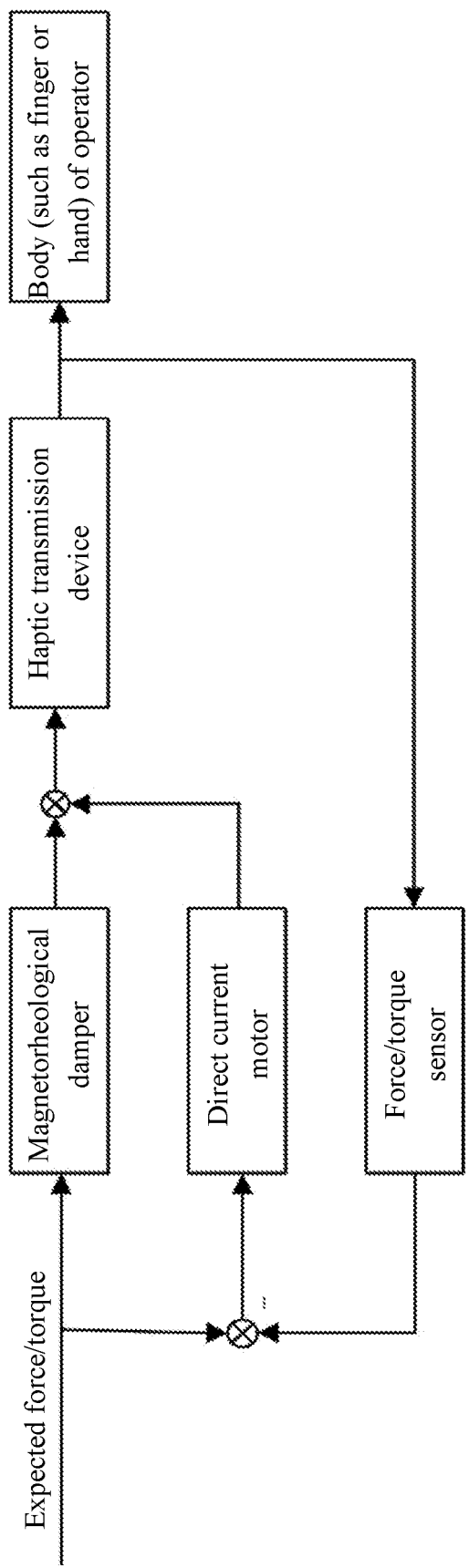
FIG. 5 is a diagram illustrating a control principle of the haptic rendering method.

Step (B): convert an expected force/torque value to a current input signal of the magnetorheological damper, output a corresponding torque through the magnetorheological damper, and then apply the torque to a body (such as a finger and a hand) of the operator through a haptic transmission device, wherein FIG. 4 is a flow chart of a haptic rendering method, and FIG. 5 is a diagram illustrating a control principle of the haptic rendering method. A mapping relationship between an output of the haptic transmission device and an output of the executing device is set as $T_h=1$, an expected force/torque is 211.6 N·mm, then a converted current input signal of the damper is 0.4 A, an actual output of the damper is 229.1 N·mm, and then the force/torque applied on the body of the operator is 229.1 N·mm.

Step (C): measure the actually applied force/torque value by a force/torque sensor mounted at a force/torque application point, compare an actual output with an expected output, and calculate a force/torque error, wherein an error fed back by the force/torque sensor is −17.5 N·mm.

Step (D): an input signal of the direct current motor converts from the force/torque error being −0.175 A, which directly drives the direct current motor to generate a torque corresponding to the error, i.e., −17.5 N·mm.

step (E): superpose an output of the direct current motor and an output of the original magnetorheological damper to eliminate the force/torque error and realize precise control over the force/torque, wherein the force/torque finally applied on the body of the operator is −17.5+229.1=211.6 N·mm, i.e., the expected torque.

What is claimed is:

1. A minitype haptic rendering method based on active and passive devices, comprising the following steps of:

step (A): constructing a minitype haptic rendering device, the device comprising an executing device, a force/torque sensor and a haptic transmission device, and the executing device comprising a magnetorheological damper and a direct current motor; calibrating the magnetorheological damper and the direct current motor, and obtaining a relationship between an input current and an output torque; and setting a calibration curve function of the magnetorheological damper as:

$$y1=f_b(x),$$

the input current having a linear relationship with an output of the direct current motor, and setting a calibration curve function of the direct current motor as:

$$y2=k_m x,$$

wherein, y1 and y2 are respectively output torques of the magnetorheological damper and the direct current motor; x is the input current; $f_b$ is a mapping relationship between the input current and an output torque of the magnetorheological damper; and $k_m$ is a mapping relationship between the input current and an output torque of the motor;

step (B): converting an expected force/torque value to a current input signal of the magnetorheological damper, outputting a corresponding torque through the magnetorheological damper, applying the torque to a body of an operator through the haptic transmission device, setting the expected force/torque as F, and a mapping relationship between an output of the haptic transmission device and an output of the executing device as $T_h$, then a theoretical value of the output of the magnetorheological damper being $T_h^{-1}(F)$, and the converted current input signal of the magnetorheological damper being $f_b^{-1}[T_h^{-1}(F)]$, setting an actual output of the magnetorheological damper corresponding to the input current i as $T_b(i)$, then the actual output of the magnetorheological damper being $T_b\{f_b^{-1}[T_h^{-1}(F)]\}$, then the force/torque applied on the body of the operator being $T_h\{T_b\{f_b^{-1}[T_h^{-1}(F)]\}\}$;

step (C): measuring the actually applied force/torque value by a force/torque sensor mounted at a force/torque application point, comparing an actual output with an expected output, and calculating a force/torque error, wherein the error fed back by the force/torque sensor can be represented as:

$$\Delta = F - T_h\{T_b\{f_b^{-1}[T_h^{-1}(F)]\}\};$$

step (D): converting the force/torque error to an input signal of the direct current motor, driving the direct current motor to generate a torque corresponding to the error, and setting a force/torque actually compensated by the direct current motor as Δm; and step (E): superposing the output of the direct current motor and the output of the original magnetorheological damper to eliminate the force/torque error, wherein the force/torque finally applied on the body of the operator can be represented as:

$$T_h(\Delta m) + T_h\{T_b\{f_b^{-1}[T_h^{-1}(F)]\}\}.$$

2. The minitype haptic rendering method according to claim 1, wherein a least square method, a neural network algorithm or a support vector machine algorithm is used for calibrating the magnetorheological damper.

\* \* \* \* \*